United States Patent [19]

Helmick

[11] Patent Number: 4,519,904
[45] Date of Patent: May 28, 1985

[54] CONTINUOUS FILTERING SYSTEM FOR COOKING OIL

[76] Inventor: Timothy A. Helmick, 7465 Hills & Dales Rd., Massillon, Ohio 44646

[21] Appl. No.: 578,840

[22] Filed: Feb. 10, 1984

[51] Int. Cl.³ .............................................. B01D 35/00
[52] U.S. Cl. .................................... 210/167; 210/173; 210/174; 210/DIG. 8; 99/408
[58] Field of Search .............. 210/167, DIG. 8, 416.1, 210/304, 173, 174; 99/408; 241/46 B, 46.06, 21, 221, 222, 68, 73

[56] References Cited

U.S. PATENT DOCUMENTS

| | | | |
|---|---|---|---|
| 2,639,096 | 5/1953 | Hinerfeld | 241/222 |
| 2,903,197 | 9/1959 | Willems | 241/46.06 |
| 3,280,722 | 10/1966 | Rahauser | 210/304 |
| 3,524,487 | 8/1970 | Paoli | 241/68 |
| 3,667,374 | 6/1972 | Holmes | 210/167 |
| 3,685,433 | 8/1972 | Cunningham | 99/408 |
| 3,968,741 | 7/1976 | Hunt | 210/186 |
| 3,977,973 | 8/1976 | Anderson | 210/167 |
| 4,428,534 | 1/1984 | Maijala et al. | 241/18 |

Primary Examiner—Richard V. Fisher
Assistant Examiner—Sharon T. Cohen
Attorney, Agent, or Firm—Michael Sand Co.

[57] ABSTRACT

A food chopper pump is connected by a conduit to an outlet opening at the bottom of a frying well which contains cooking oil used in the frying of various foods. The chopper pump contains a motor-driven rotor having a plurality of radially movable vanes spaced about the periphery which chop large food particles entering the chopper pump from the frying well. The rotor is mounted eccentrically, whereby the vanes are movable radially inwardly to prevent large food particles from stopping the motor in one portion of the pump yet which provides a sealing effect when moving through another portion of the chopper pump. The comminuted food particles and oil pass through a coarse filter which removes most of the food particles from the oil before passing through a fine filter which removes any smaller remaining food particles, after which the filtered oil is returned to the frying well. A valved bypass line enables the system to continue to operate during the replacement of the filters. The motor shaft is separated by a thermal barrier from the chopper pump to reduce the transfer of heat from the hot oil in the chopper pump to the motor.

25 Claims, 13 Drawing Figures

CONTINUOUS FILTERING SYSTEM FOR COOKING OIL

BACKGROUND OF THE INVENTION

1. Field of the Invention

The invention relates to filtering systems for use with food fryers and particularly to a system which continuously filters and purifies the cooking oil, even when the fryer is in use and when the oil is heated. More particularly, the invention relates to a continuous cooking oil filtering system having a unique chopper pump which comminutes the food particles contained in the oil whereby the particles can be removed easily from the oil by filtering before the oil is returned into the fryer.

2. Description of the Prior Art

Restaurants and other establishments in which food is prepared use fryers for the preparation of many foods. These fryers contain a quantity of cooking oil in a frying well which is heated to a predetermined temperature such as 325° F. for the preparation of food such as chicken, potatoes, onions and fish. Many of these foods are covered with flour or dough before immersion in the cooking oil. Although these fryers cook the food satisfactorily, problems are encountered in that an appreciable amount of food particles accumulate in the oil. These food particles will affect the flavor of the foods being cooked in a relatively short period of time, especially where different foods are cooked in the same oil which requires frequent cleaning and/or replacement of the cooking oil.

In many food establishments, the cooking oil is removed from the frying well at the end of each day and passed through a mesh cloth or other filter and into a second vessel, whereupon it is poured back into the frying well. This procedure must be accomplished when the fryer is inoperative and removed from service and the cooking oil has cooled to a safe temperature for handling by the restaurant personnel. Even if cleaned at the end of each day, the cooking oil ordinarily must be disposed of after several days of use. This requires an additional cost to the restaurant owner due to the considerable amount of cooking oil required. For example, many usual fryers will contain approximately thirty or forty pounds of cooking oil. Furthermore, the manual filtering of the cooking oil requires a considerable amount of manpower and "down time" of the fryers from service.

A solution to this problem has been attempted by several systems which continuously filter and recycle the cooking oil, such as shown in U.S. Pat. Nos. 3,280,722, 3,685,433, 3,968,741 and 3,977,973.

These prior art filtering systems usually are complicated, expensive, and occupy an excessive amount of space. Also many of these systems are not adaptable to existing food fryers, and more importantly are highly susceptible to clogging requiring frequent changing of the filters due to the size of the food particles. Also, such systems must be removed from service or rendered inoperative while changing of the filters takes place.

There is no known continuous filtering system for cooking oil of which I am aware which eliminates these problems in a relatively simple, rugged and efficient arrangement of components as in my system.

SUMMARY OF THE INVENTION

Objectives of the invention include providing a filtering system for cooking oil in which the oil is continuously circulated through a device which comminutes the larger food particles in the oil into smaller particles whereby the same can be removed easily from the cooking oil in a series of filters, and in which the system equipment is formed of stainless steel or other types of materials which does not contaminate or affect the taste and quality of the cooking oil and which can easily withstand the heat of the oil which is about 350° F. Another objective is to provide such a filtering system which is provided with a bypass arrangement whereby the food particle filters can be replaced without requiring the system to be shut off, and which eliminates handling of the hot cooking oil as is required in the heretofore manually filtered and recycled cooking oil systems.

Another objective of the invention is to provide such a filtering system in which the drive motor for the food chopper and pump device is thermally isolated therefrom to prevent the heat of the cooking oil from being transmitted to the motor, resulting in shortening of motor life and inefficiency. Also the continuous filtering of the oil, in addition to eliminating daily manual filtering, will extend the life of the cooking oil as a result of the immediate removal of impurities (food particles) from the oil which heretofore remained in the oil for extended periods of time and imparted a bad taste or unwanted flavor to the oil requiring frequent replacement of the oil with new oil. Another objective is to provide such a system which is adaptable to existing fryers, either gas or electric, requiring practically no modifications thereof, and which is a compact assembly that can be mounted partially beneath the fryer and attached to the fryer door, or placed in other locations in the fryer cabinet where space is available, and which can be provided as a separate unit and attached to existing fryers or formed as an integral part of new fryers.

A further objective of the invention is to provide such a filtering system in which the improved chopper pump device has a rotor provided with a plurality of vanes which due to the eccentric mounting of the rotor provide a sealing effect with the walls of the flow chamber when the vanes pass through a predetermined rotational angle which improves the discharge of the chopped food particles and oil through the outlet opening of the chopper pump, thereby reducing the amount of oil and food particles circulated throughout the entire chamber and which would subsequently mix with the incoming oil and food particles, thereby increasing the efficiency of the system. Still another objective is to provide such a system which is formed of relatively inexpensive and rugged components, many of which are readily available, eliminating more expensive specially manufactured components. Furthermore, the improved system will reduce the operating costs of a restaurant owner while providing a more satisfactory food product free of possible tainted flavors and impurities which are imparted to the food since the food particles remain in the cooking oil for extended periods of time, and which eliminates difficulties existing in the art, solves problems, satisfies needs and obtains new results in the art.

These objectives and advantages are obtained by the improved continuous filtering system for cooking oil of the invention, the general nature of which may be stated as including a first conduit adapted to be connected to an opening formed adjacent the bottom of the fryer; chopper pump means connected to the first conduit for chopping up food particles contained in the cooking oil flowing through the first conduit from the fryer and for pumping said cooking oil through said chopper pump means; a second conduit operatively connected to the chopper pump means for conveying the cooking oil and chopped food particles from the chopper pump means; filter means operatively connected to the second conduit for removing the chopped food particles from the cooking oil; and a third conduit connected to the filter means for conveying the filtered oil from the filter means back into the fryer.

BRIEF DESCRIPTION OF THE DRAWINGS

A preferred embodiment of the invention, illustrative of the best mode in which applicant has contemplated applying the principles, is set forth in the following description and shown in the drawings and is particularly and distinctly pointed out and set forth in the appended claims.

Similar numerals refer to similar parts throughout the drawings.

DESCRIPTION OF THE PREFERRED EMBODIMENT

Figure 1:
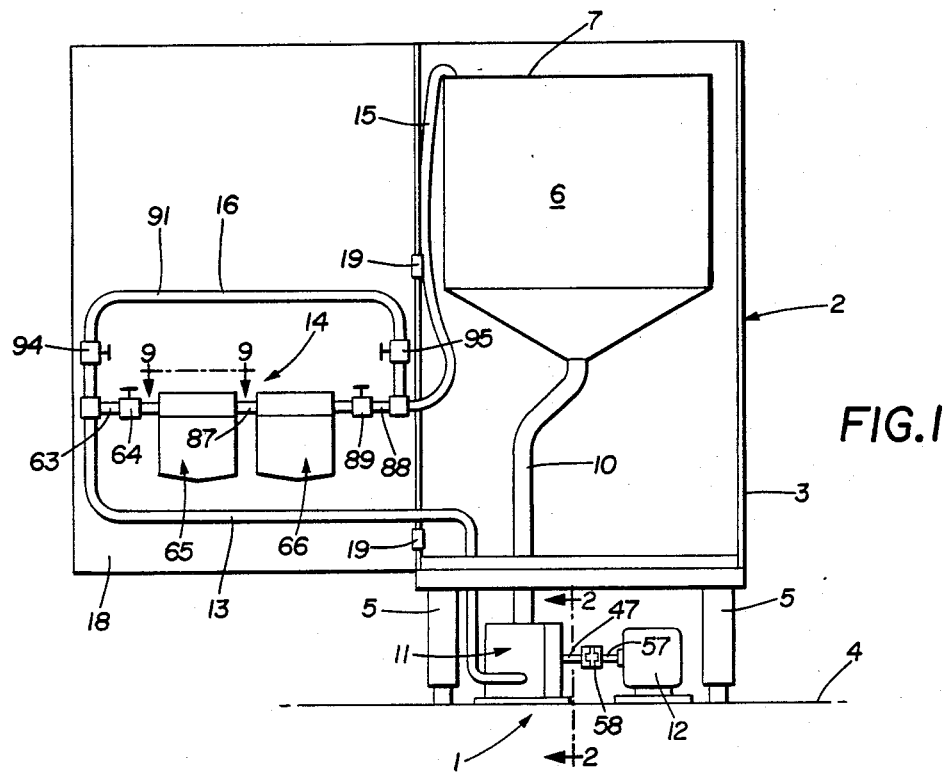
FIG. 1 is a diagrammatic view of a food fryer having the improved continuous filtering system mounted thereon with the fryer door being shown in open position.

The improved filtering system is indicated generally at 1, and is shown in FIG. 1 mounted on a usual food fryer, indicated generally at 2. Fryer 2 is of a usual construction and is shown in general diagrammatic form in FIG. 1, and includes a cabinet 3 preferably formed of stainless steel sheets, which is supported on a floor 4 by a plurality of corner legs 5. A cooking oil container 6 is mounted in the upper portion of cabinet 3 and provides a frying well 7 therein. The usual baskets for holding the food which is immersed in the cooking oil contained in well 7 are not shown nor are the other usual components of a fryer. Fryer 2 may have other configurations than that shown in the drawings without affecting the concept of the invention.

Improved filtering system 1 includes as its main components a first conduit 10 which communicates with an opening formed in the bottom of oil container 6, an improved chopper pump 11, a motor 12, a second conduit 13 which connects chopper pump 11 with a filtering unit which is indicated generally at 14. Filtering unit 14 is connected to cooking well 7 by a third conduit 15. A valved bypass unit 16 communicates with conduits 13 and 15.

Chopper pump 11 and motor 12 preferably will be mounted on floor 4 immediately beneath fryer 2, thereby eliminating any additional space requirements within fryer cabinet 3, with filtering unit 14, bypass unit 16 and conduits 13 and 15 being mounted on cabinet door 18. Door 18 usually will be pivotally mounted by hinges 19 on fryer cabinet 3.

In accordance with one of the main features of the invention, chopper pump 11, shown particularly in FIGS. 2 through 7, receives the cooking oil and food particles contained therein from cooking well 7 through conduit 10. Chopper pump 11 comminutes the food particles into extremely smaller particles to facilitate their removal by filtering unit 14 from the cooking oil and to prevent clogging of the system equipment as occurs in prior systems. Chopper pump 11 includes a housing, indicated generally at 21 (FIGS. 4 and 5), preferably formed of stainless steel or other material which is unaffected by the hot oils and which will not contaminate or affect the quality and taste of the cooking oil.

Figures 2, 3:
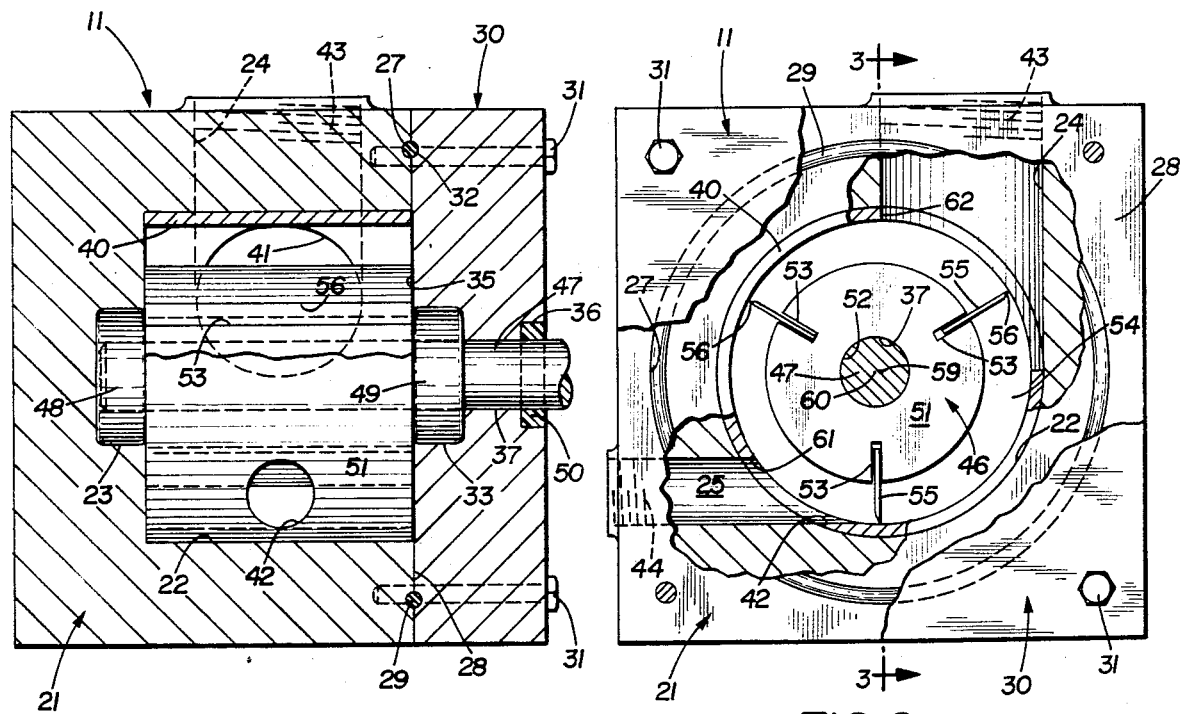
FIG. 2 is an enlarged vertical sectional view of the improved food chopper pump assembly taken on line 2—2, FIG. 1.
FIG. 3 is a sectional view of the chopper pump assembly taken on line 3—3, FIG. 2, with portions broken away and in section.
Figure 4:
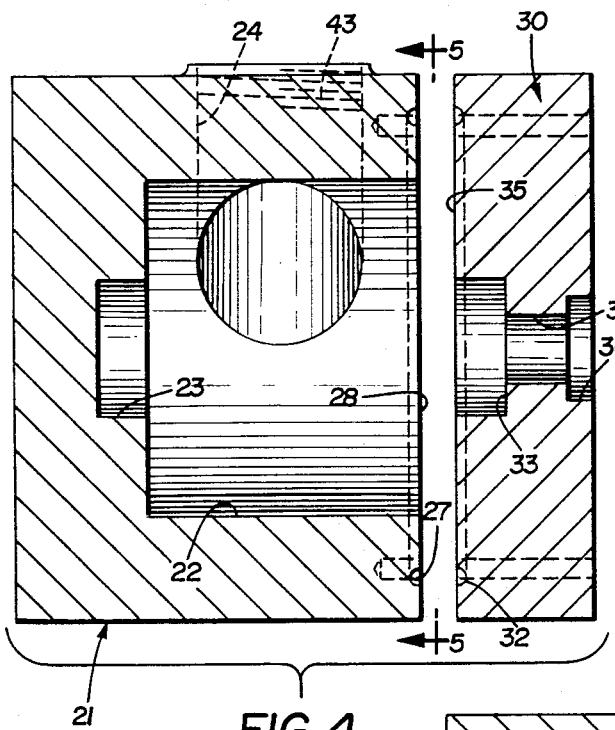
FIG. 4 is a sectional view similar to FIG. 3 of the chopper pump housing and cover with the internal components removed therefrom.
Figure 5:
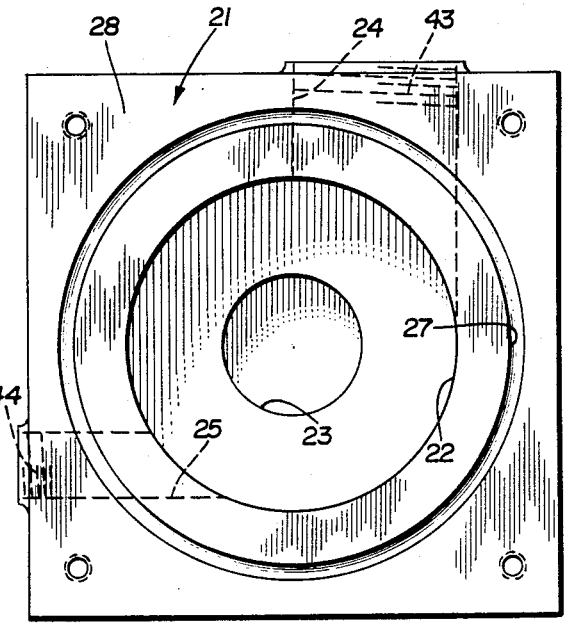
FIG. 5 is a view looking in the direction of arrows 5—5, FIG. 4.

Housing 21 preferably has a cubical configuration, as shown in FIGS. 4 and 5, and is formed with a main cylindrical-shaped rotor-receiving chamber 22 and an appreciably smaller bearing-receiving recess 23. Inlet and outlet passages 24 and 25, respectively, are formed in housing 21 and communicate with main chamber 22. Inlet passage 24 is approximately six times larger in transverse cross-sectional area than outlet passage 25. An annular groove 27 is formed in housing face 28 concentric about main chamber 22 for receiving a sealing O-ring 29 (FIG. 2) when housing cover 30 is mounted thereon by a plurality of bolts 31. Housing cover 30 also has an annular groove 32 formed therein which cooperates with housing groove 27 for receiving a portion of O-ring 29 therein. Housing cover 30 is formed with a cylindrical-shaped recess 33 on its inner face 35 which communicates with a smaller outer cylindrical-shaped recess 36 by a bore 37.

A cylindrical-shaped sleeve 40 (FIG. 6), which is complementary in shape and size to housing chamber 22, is telescopically slidably mounted within main chamber 22, as shown in FIGS. 2 and 3. Sleeve 40 preferably is formed of stainless steel. Sleeve 40 is formed with an inlet opening 41, generally oval in shape, which aligns with inlet passage 24 of housing 21, and a smaller outlet opening 42 which aligns with outlet passage 25 when sleeve 40 is mounted within main chamber 22. Inlet passage 24 preferably is internally threaded at 43 for connecting to the end of first conduit 10 which communicates with oil container 6. Likewise, outlet passage 25 is internally threaded at 44 for connecting with an end of second conduit 13 as shown in FIG. 1.

Figure 7:
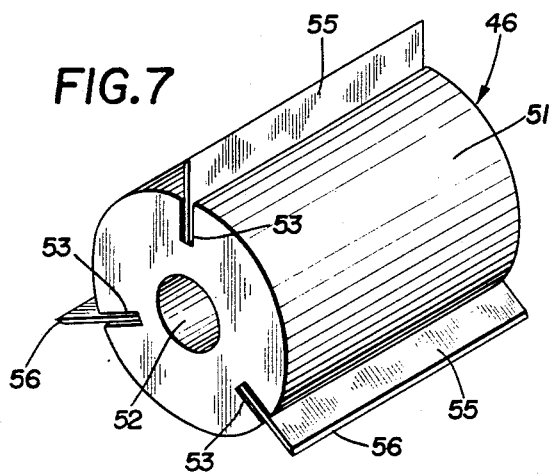
FIG. 7 is a perspective view of the rotor of the chopper pump assembly of FIGS. 2 and 3 removed from the housing shown in FIGS. 4 and 5.
Figure 6:
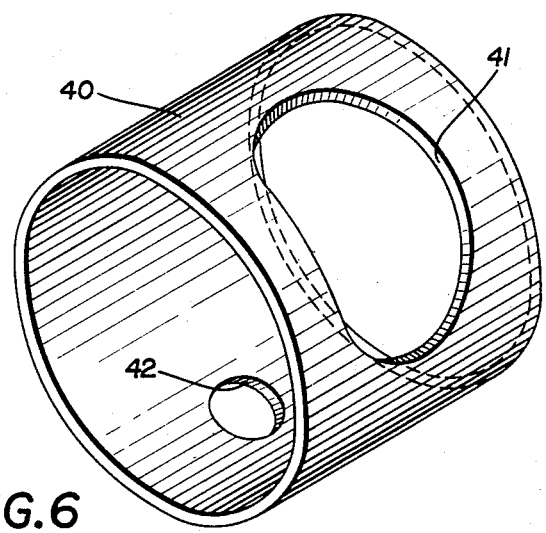
FIG. 6 is a perspective view of the cylindrical sleeve liner of the chopper pump assembly shown in FIGS. 2 and 3.

Referring to FIG. 7, a rotor, indicated generally at 46, is rotatably mounted within chamber sleeve 40, as shown in FIGS. 2 and 3, by a shaft 47 and a pair of spaced bearings 48 and 49 which are mounted within recesses 23 and 33, respectively. Shaft 47 extends through bore 37 of housing cover 30 and a seal 50 is telescopically mounted on shaft 47 and is located within recess 36 in the outer face of housing cover 30. Rotor 46 includes a cylindrical-shaped body 51 also formed of stainless steel having a central bore 52 and a plurality of longitudinally extending and radially inwardly projecting slots 53 spaced equally about the periphery of rotor body 51. Three grooves are shown in the particular rotor embodiment of FIG. 7, each of which is spaced 120° apart.

A vane 55 is slidably mounted in each slot 53. Vanes 55 terminate in sharpened edges 56 which provide the cutting elements of chopper pump 11. Vanes 55 are relatively thin strips of stainless steel having a thickness, for example, of ⅛ inch to provide sufficient strength and rigidity thereto to be unaffected when encountering large food particles while chopping the same.

Referring to FIG. 1, rotor shaft 47 is connected to a drive shaft 57 of motor 12 by a flexible thermal coupler 58 so that the heat of the cooking oil will not be transferred along shaft 57 and into motor 12 seriously affecting the operation and life of the motor. Motor 12 preferably is an electrically driven motor and is connected to a source of electrical power by a usual power line.

In accordance with another feature of the invention, bearing recesses 23 and 33, as well as shaft bore 37, are formed in housing 21 and cover 30 so that rotor 46 is mounted eccentrically with respect to the interior of sleeve 40 and chamber 22. The amount of eccentricity is relatively small and is illustrated in FIG. 2 by points 59 and 60, with point 59 representing the central axes of sleeve 40 and chamber 22 and point 60 representing the axis of rotor 46. The amount of eccentricity of the mounting of rotor 46 with respect to sleeve 40 is dependent upon the radial depth of rotor slots 53 and the radial lengths of vanes 55, and can vary depending on the particular size and final application of chopper pump 11. This eccentricity provides that upon rotation of rotor 46 in a clockwise direction when viewing FIGS. 2 and 8, the particular vane 55 immediately after passing beyond outlet passage 25, which is indicated at 61, will "bottom out" in rotor slot 53, at which position blade edge 56 will be in sliding engagement with or in extremely close proximity to the inside surface of sleeve 40 (FIG. 8) and will maintain this general sealing engagement therewith until the vane passes beyond the start of inlet passage 24, indicated at 62. Likewise, vanes 55 will move outwardly from the bottom of slots 53 by the centrifugal force acting thereon when moving in a clockwise direction between reference points 62 and 61. This provides limited radial inward movement of the vanes in this area when the vanes encounter incoming food particles in the cooking oil, so that the rotor and vanes will not become bound or wedged against the inside surface of sleeve 40. The vanes will retract sufficiently to permit the food particle to pass of the vanes will move by the food particle.

Figure 8:
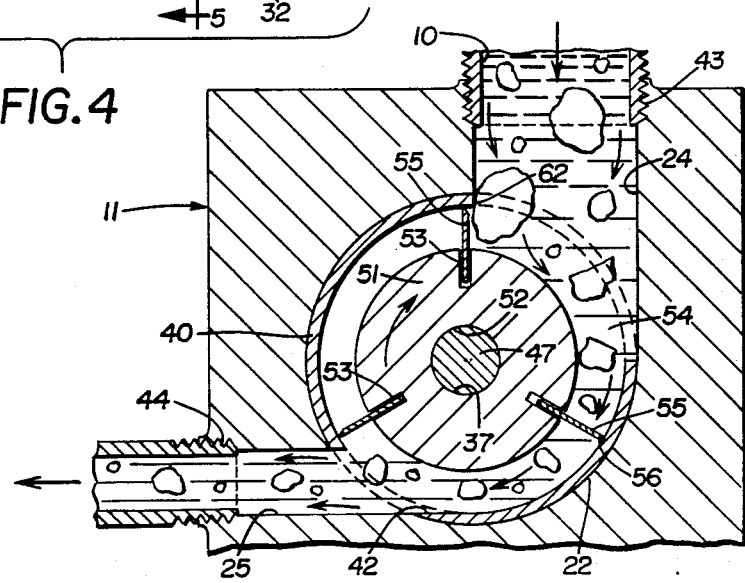
FIG. 8 is a fragmentary diagrammatic sectional view similar to FIG. 2 with the rotor shown in a different rotational position and the cooking oil and food particles moving therethrough.

Thus, the cooking oil and food particles will enter the annular flow space 54 which is formed between rotor 46 and sleeve 40 through conduit 10 and inlet passage 24 and will be carried by the clockwise rotating rotor vanes until being discharged through outlet passage 25 (FIG. 8). The sharpened edges 56 of vanes 55 will chop and comminute the food particles as they enter this annular space. The bottoming out of the vanes 55 upon reaching point 61 will provide a sealing action which will enable most of the cooking oil and comminuted particles to be discharged through outlet passage 25 and into conduit 13 and not be carried throughout the remainder of the annular space and remixed with the incoming oil and food particles.

Figure 9:
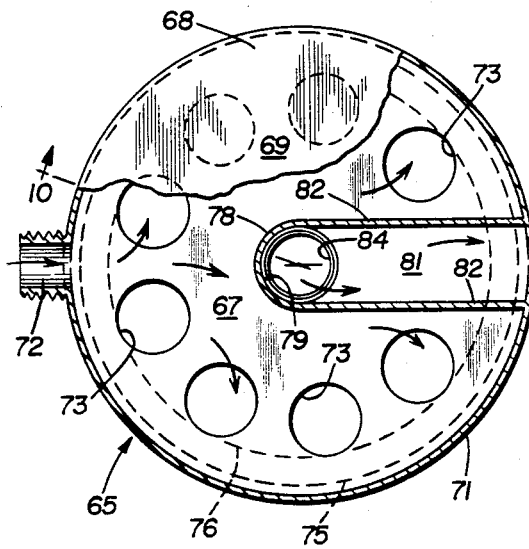
FIG. 9 is an enlarged top plan view of one of the filters of the filtering unit looking in the direction of arrows 9—9, FIG. 1.
Figure 10:
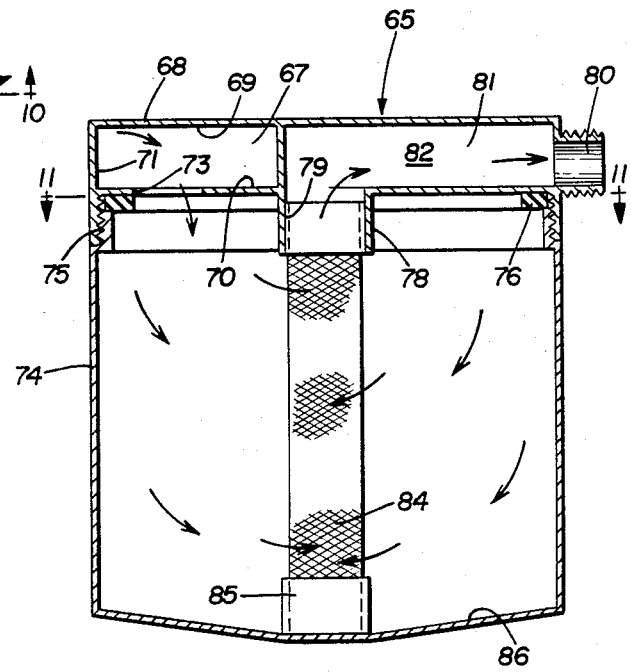
FIG. 10 is a sectional view taken on line 10—10, FIG. 9.
Figure 11:
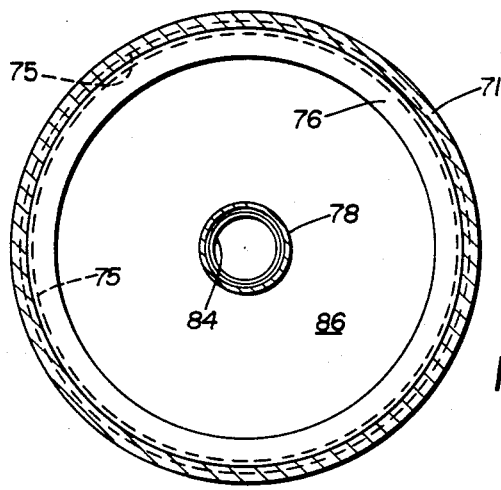
FIG. 11 is a sectional view taken on line 11—11, FIG. 10.

The cooking oil and comminuted food particles will continue along conduit 13 due to the pumping action of rotor 46 and vanes 55 and will enter filter unit 14 through a short section of conduit 63 having a normally open valve 64 mounted therein. Filter unit 14 includes coarse and fine filters, indicated generally at 65 and 66, respectively. Filters 65 and 66 are shown in FIG. 1 as two separate components but may be a single filtering unit having coarse and fine filtering sections therein. Filters 65 and 66 are similar and therefor only coarse filter 65 is shown in detail in FIGS. 9, 10 and 11 of the drawings and described in detail below.

Filter 65 includes a shallow cylindrical-shaped manifold or lid 68 formed by circular top and bottom walls 69 and 70 which are spaced from each other by an elongated cylindrical side wall 72. Walls 69, 70 and 71 form a fluid-receiving chamber 67 into which the cooking oil and comminuted food particles flow from conduit 63 through an inlet opening 72. A plurality of spaced holes 73 are formed in bottom wall 70 through which the incoming oil and food particles will drop into a canister 74 which is removably mounted on the lower end of side wall 71 by a threaded connection 75. A seal 76 is located at threaded connection 75 to provide a liquid-tight seal between canister 74 and filter lid 68.

An annular collar 78 surrounds an outlet opening 79 formed in the center of bottom wall 70 and extends downwardly therefrom. Opening 79 communicates with an outlet opening 80 which is formed in side wall 71 by a channel 81 formed by a pair of spaced walls 82. Walls 82 extend between top and bottom lid walls 69 and 70 so that the outgoing filtered cooking oil will not mingle with the incoming unfiltered cooking oil.

A filtering element 84 having a cylindrical configuration formed of a predetermined size mesh, preferably stainless steel, is removably mounted within top collar 78 and a lower similar collar 85 which is formed on bottom wall 86 of canister 74. The incoming cooking oil and food particles upon entering fluid chamber 67 will fall into and collect in canister 74. The oil and some of the smaller food particles will pass through filtering element 84 and upwardly outwardly through channel 81 and outlet opening 80 and into fine filter 66 through a coupling conduit 87. Fine filter 66 preferably is similar to coarse filter 65 except that the filtering element 84 will have a smaller mesh screen to provide a finer filtering medium therefor. The partially filtered cooking oil will enter fine filter fluid chamber 67 through conduit 87 and flow downwardly into canister 74 outside of filtering element 84 and then inwardly into the center of filtering element 84 and then upwardly through the center thereof and through channel 81 into conduit 88.

Fine filtering element 84 will remove the extremely minute and small comminuted particles of food not removed by the coarse filter, further purifying the cooking oil. The filtered oil then flows through conduit 88, having a normally open valve 89 mounted therein, and through conduit 15 into the cooking well 7. In desired, a baffle or other deflection means may be mounted at the outlet end of conduit 15 to prevent splashing of the incoming purified oil when mingling with the oil in the cooking well.

Another feature of the improved filtering system is the mounting of valved bypass unit 16 in cooperation with filter unit 14. Bypass unit 16 includes a U-shaped section of conduit 91 which is connected to conduits 13, 63 and 88, 15, respectively. A pair of normally closed valves 94 and 95 are mounted in bypass conduit 91 and enable filters 65 and 66 to be replaced without shutting off pump 12 by closing valves 64 and 89 and opening valves 94 and 95. This arrangement merely enables the comminuted particles and oil to flow through conduits 91 and 15 and back into the cooking well during the replacement of the filtering elements which will take a relatively short period of time. Immediately after replacing the filtering elements, valves 64 and 89 are opened and valves 94 and 95 are closed. The oil containing the comminuted particles that bypassed the filters during this short replacement time period will be refiltered during its subsequent movement through the filtering units.

In a preferred example of filtering system 1, chopper pump 11 will be 4 inches on all sides and chamber 22 will have a $2\frac{1}{2}$ inch diameter. Rotor body 51 will have a $1\frac{5}{8}$ inch diameter and shaft 47 will have a $\frac{1}{2}$ inch diameter, with sleeve 40 being approximately $\frac{1}{8}$ inch thick. Inlet passage 24 will be circular having a $1\frac{1}{4}$ inch diameter and outlet passage 25 will be circular having a $\frac{1}{2}$ inch diameter which provides an inlet passage having a transverse cross-sectional area approximately six times greater than that of the outlet passage. The axis of inlet passage 24 forms an included angle of approximately 90° with the axis of outlet passage 25 (FIG. 5) whereby the oil and comminuted food particles will flow through an arcuate distance of approximately 270°. Filter lid 68 will have a diameter of 4 inches and filters 65 and 66 will have a height of approximately $4\frac{1}{2}$ inches. Thus, it is seen that the sizes of the main components are relatively small with respect to fryer 2 which for certain models will have an overall height of 46 inches and a working height of 34 inches with a clearance of 6 inches from the bottom of cabinet 3 to floor 4.

Figure 13:
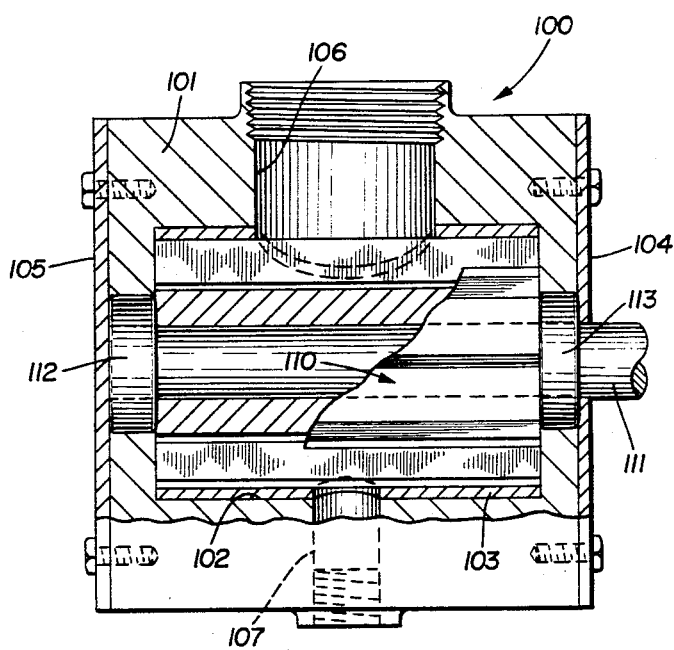
FIG. 13 is a sectional view similar to FIG. 3 of the modified chopper pump assembly.
Figure 12:
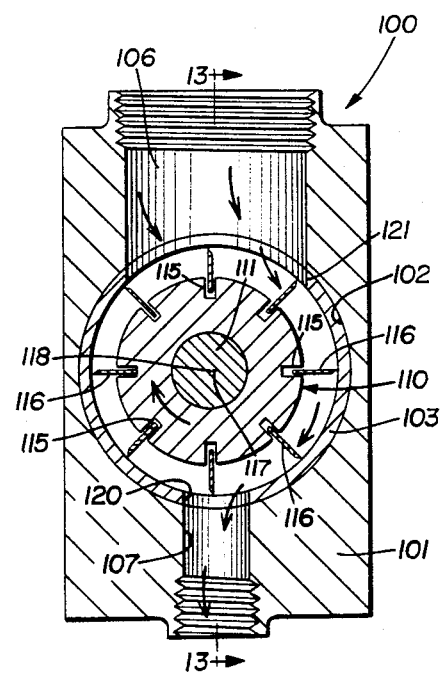
FIG. 12 is a sectional view similar to FIG. 2, showing a modified chopper pump assembly.

A modified form of the improved chopper pump 11 is shown in FIGS. 12 and 13 and is indicated generally at 100. Modified chopper pump 100 is similar in many respects to chopper pump 11 and includes a housing 101 formed with a central bore 102 which extends generally through the housing. A stainless steel cylindrical sleeve 103 similar to sleeve 40 is mounted within bore 102. Both ends of central bore 102 are covered by end plates 104 and 105.

An inlet passage 106 and an outlet passage 107 are formed in housing 101 and communicate with bore 102 and are located diametrically opposite with respect to each other as opposed to the spacing configuration of passages 24 and 25 of chopper pump 11. Again, inlet passage 106 is approximately six times in cross-sectional area greater than that of outlet passage 107. Passage 106 is adapted to be connected to conduit 10 and outlet 107 is adapted to be connected to conduit 13 when replacing chopper pump 11.

A modified rotor 110 is rotatably mounted within bore 102 by a shaft 111, which is similar to shaft 47, by spaced bearings 112 and 113. Rotor 110 is slightly different from rotor 46 in that it is provided with eight longitudinally extending slots 115 in which vanes 116 are slidably mounted. Vanes 116 are equally spaced 45° apart. Again, rotor 110 is mounted eccentrically with respect to the axis of housing bore 102, shown by axis 117 of bore 102 and axis 118 of rotor 110. This eccentric mounting provides the same features as those described above. Vanes 116 when moving in the clockwise direction of FIG. 12 between edge 120 of outlet passage 107 and edge 121 of inlet passage 106 will "bottom out" to provide a sealing effect against the inside surface of sleeve 103.

Chopper pump 100 is referred to as a straight-flow-through action and enables different velocities of oil flow and chopper rotation to be achieved than that of chopper pump 11, although the results are similar in that the incoming food particles are comminuted by the sharp edges of vanes 116 so that the particles can be removed upon the cooking oil flowing through coarse and fine filters 65 and 66.

Filtering system 1 provides a means for effectively filtering hot cooking oils from a food fryer while the fryer is cooking food without any manual manipulation required to handle the heated oil in order to remove the food particles from the oil thereby enabling the oil to be used for a considerably greater time period than when the oil was filtered previously by manual means, since the oil is continuously being filtered, reducing the time in which the food particles remain in the hot oil and contaminating the same. The improved system also removes greater impurities present in the cooking oil than believed possible with known filtering systems due to the coarse and fine filters through which the cooking oil is continuously moved and in which the system is less susceptible to blockage due to the chopping and comminuting action of the improved chopper pump which comminutes the food particles into sufficiently small sizes whereby they can move more freely through the pump without clogging the same and into the filtering units for their removal. In prior filtering systems, the larger food particles jam or seriously clog the filters, pumps and associated components, requiring frequent shutdown of the system to unclog the same. Also, the bypass unit of the filters enables the system to continuously operate during replacement of the filter.

Accordingly, the improved system is simplified, provides an effective, safe, inexpensive, and efficient arrangement which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the continuous filtering system for cooking oil is constructed and used, the characteristics of the system, and the advantageous, new and useful results obtained, the new and useful structures, devices, elements, arrangements, parts, and combinations, are set forth in the appended claims.

I claim:

1. Equipment in combination with a food fryer for continuously filtering and recirculating cooking oil contained in said fryer, said equipment including:
   (a) a first conduit connected to an opening formed adjacent the bottom of the fryer;
   (b) chopper pump means connected to the first conduit for chopping up food particles contained in the cooking oil flowing through the first conduit from the fryer and for pumping said cooking oil through said chopper pump means;
   (c) a second conduit operatively connected to the chopper pump means for conveying the cooking oil and chopped food particles from the chopper pump means;
   (d) filter means operatively connected to the second conduit for removing the chopped food particles from the cooking oil; and
   (e) a third conduit connected to the filter means for conveying the filtered oil from the filter means back into the fryer.

2. The equipment defined in claim 1 in which the chopper pump means includes:
   (a) a housing formed with a cylindrical-shaped chamber;
   (b) inlet and outlet passages communicating with the chamber;
   (c) a rotor rotatably mounted in the chamber, said rotor having a plurality of spaced outwardly extending vanes for chopping up food particles and for moving the cooking oil and food particles from the inlet passage through a portion of the chamber and out of the outlet passage; and
   (d) a motor operatively connected to the rotor for rotatably driving said rotor.

3. The equipment defined in claim 2 in which the rotor is mounted eccentric with respect to the center of the cylindrical-shaped chamber.

4. The equipment defined in claim 3 in which the rotor has a plurality of elongated, circumferentially spaced slots formed in the outer periphery thereof which extend in a radially inward and longitudinal direction; and in which the vanes are slidably mounted in said slots for radial inward and outward movement with respect to said slots.

5. The equipment defined in claim 4 in which three slots are formed in the rotor and are spaced 120° apart, and in which a vane is mounted in each of said slots.

6. The equipment defined in claim 5 in which an imaginary center line of the inlet passage forms an included angle of approximately 90° with an imaginary center line of the outlet passage.

7. The equipment defined in claim 2 in which the cross-sectional area of the inlet passage is approximately six times greater than the cross-sectional area of the outlet passage.

8. The equipment defined in claim 2 in which the rotor drive motor has a shaft which is connected to the rotor of the chopper pump means for rotating said rotor; and in which the motor shaft is connected to the rotor by thermal barrier coupling means for reducing the transfer of heat from the rotor to the motor.

9. The equipment defined in claim 2 in which a cylindrical sleeve is telescopically mounted within the cylindrical-shaped chamber; and in which the rotor is telescopically mounted within the cylindrical sleeve and forms an annular-shaped flow space between the rotor and sleeve.

10. The equipment defined in claim 9 in which the vanes are located within and move through the annular-shaped flow space to move the cooking oil and food particles from the inlet passage out of the chamber through the outlet passage.

11. The equipment defined in claim 4 in which eight slots are formed in the rotor and are spaced approximately 45° apart, and in which a vane is mounted in each of said slots.

12. The equipment defined in claim 11 in which the axes of the inlet and outlet passages are aligned with each other, and in which said passages are located diametrically opposite with respect to the cylindrical-shaped chamber.

13. The equipment defined in claim 4 in which the vanes each have a sharp outer cutting edge.

14. The equipment defined in claim 13 in which the cutting edges of the vanes provide a general seal with the housing upon the vanes moving to their most radial inward position when rotating throughout a predetermined rotational angle due to the eccentric mounting of the rotor with respect to the cylindrical-shaped chamber.

15. The equipment defined in claim 1 in which the filter means includes a coarse filter and a fine filter, with said fine filter being located downstream from the coarse filter.

16. The equipment defined in claim 15 in which the coarse filter includes a shallow cylindrical-shaped manifold formed by spaced bottom and top walls and a cylindrical side wall; in which the side wall is formed with inlet and outlet openings and a plurality of holes are formed in the bottom wall; in which a canister is removably mounted on the manifold beneath the bottom wall to receive cooking oil and food particles entering through the inlet opening and passing through the bottom wall holes; and in which a filtering element extends downwardly from the bottom wall into the canister and communicates with the outlet opening whereby many of the food particles are retained in the canister by the filter element as the cooking oil passes through said filtering element when being discharged through the outlet opening.

17. The equipment defined in claim 16 in which the filtering element is a cylindrical-shaped screen removably mounted in the canister.

18. A device in combination with a system for the continuous filtering and recirculating of cooking oil contained in a food dryer, said device including:
   (a) a housing formed with a cylindrical-shaped chamber;
   (b) inlet and outlet passages communicating with the chamber; and
   (c) a rotor rotatably mounted in the chamber and adapted to be operatively connected to a motor for rotatably driving said rotor, said rotor having a plurality of spaced outwardly extending vanes for chopping up food particles contained in the cooking oil and for moving the cooking oil and food particles from the inlet passage through a portion of the chamber and out of the outlet passage.

19. The device defined in claim 18 in which the rotor is mounted eccentric with respect to the center of the cylindrical-shaped chamber.

20. The equipment defined in claim 19 in which the rotor has a plurality of elongated, circumferentially spaced slots formed in the outer periphery thereof which extend in radially inward and longitudinal directions; and in which the vanes are slidably mounted in said slots for radial inward and outward movement with respect to said slots.

21. The equipment defined in claim 20 in which three slots are formed in the rotor and are spaced 120° apart, and in which a vane is mounted in each of said slots.

22. The equipment defined in claim 21 in which an imaginary center line of the inlet passage forms an included angle of approximately 90° with an imaginary center line of the outlet passage.

23. The equipment defined in claim 20 in which eight slots are formed in the rotor and are spaced approximately 45° apart, and in which a vane is mounted in each of said slots.

24. The equipment defined in claim 20 in which a cylindrical sleeve is telescopically mounted within the cylindrical-shaped chamber; and in which the rotor is telescopically mounted within the cylindrical sleeve and forms an annular-shaped flow space between the rotor and sleeve; and in which the cooking oil and food particles move through a portion of said flow space when flowing from the inlet passage to the outlet passage.

25. The equipment defined in claim 24 in which the vanes each have a sharp outer cutting edge; and in which the cutting edges of the vanes provide a general seal with the cylindrical sleeve upon the vanes moving to their most radial inward position throughout a predetermined rotational angle due to the eccentric mounting of the rotor with respect to the cylindrical-shaped chamber in which the sleeve is mounted.

* * * * *